United States Patent Office 3,730,860
Patented May 1, 1973

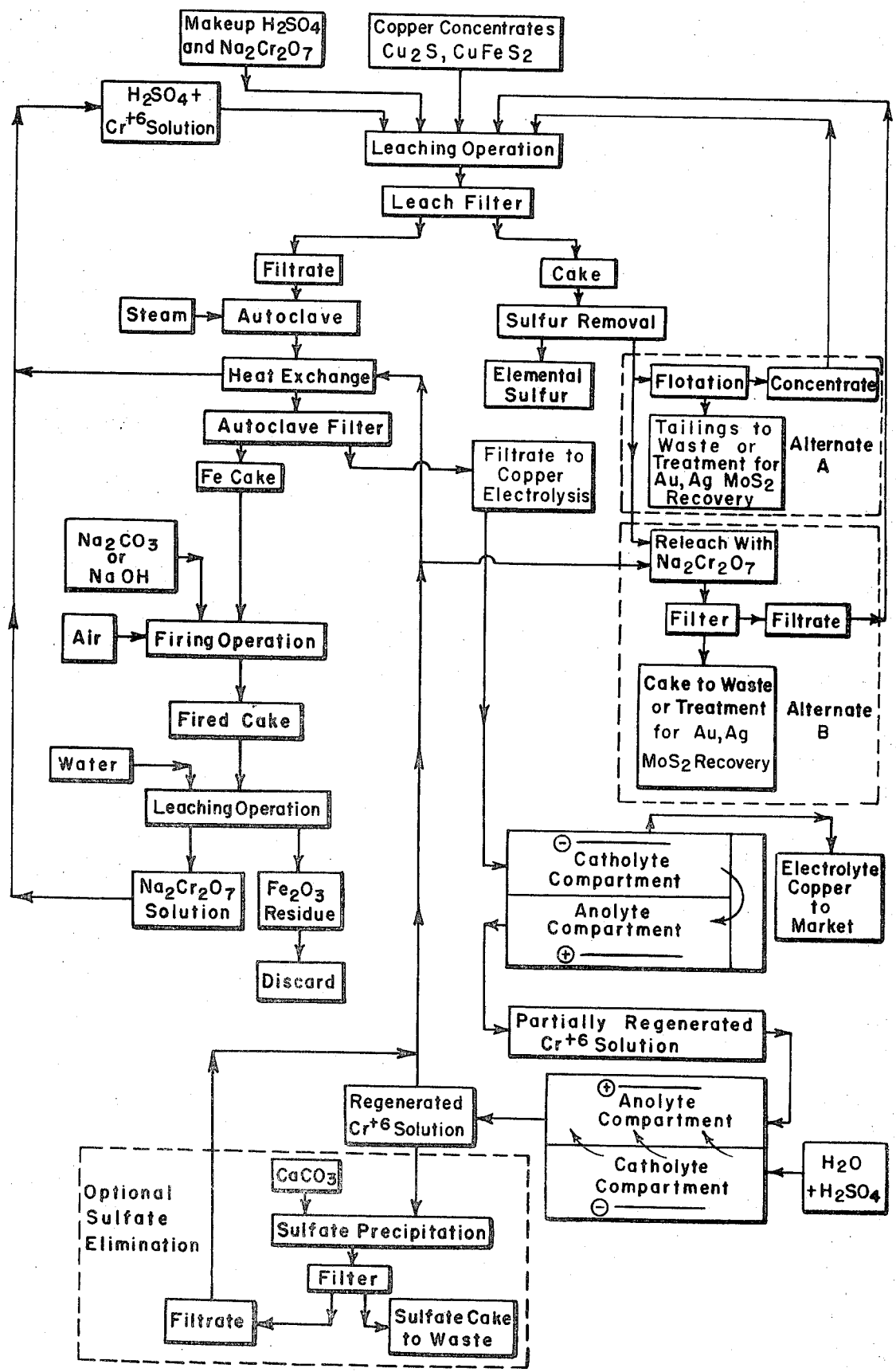

3,730,860
ELECTROLYTIC RECOVERY OF COPPER FROM OXIDIZABLE CUPRIFEROUS MATERIAL
Frank E. Horton, Sonora, Mexico, and Thomas M. Morris, Tucson, and Frank E. Christman, Inspiration, Ariz., assignors to Inspiration Consolidated Copper Company, New York, N.Y.
Filed Feb. 18, 1972, Ser. No. 227,592
Int. Cl. C22d 1/16, 15/08
U.S. Cl. 204—108
19 Claims

ABSTRACT OF THE DISCLOSURE

Oxidizable iron-bearing cupriferous material is leached with a sulfuric acid solution containing hexavalent chromium ions, e.g. chromic acid or a dichromate. The leach solution after separation from undissolved residue is hydrolyzed by heating under pressure at a temperature above 130° C. to precipitate iron as a basic sulfate salt. The iron precipitate is separated, and the residual solution is subjected to a first bifluid electrolysis to electrowin copper and to regenerate sulfuric acid and reoxidize trivalent chromium ions to hexavalent form. Anolyte discharged from the first electrolysis is subjected as anolyte in a second bifluid electrolysis to oxidize remaining trivalent chromium to hexavalent form, and thereafter the solution is recycled to the leaching operation.

NATURE OF THE INVENTION

This invention relates to the recovery of copper from oxidizabe iron-bearing cupriferous material, especially sulfidic material such as copper concentrates. In accordance with the invention, such cupriferous material is leached with a sulfuric acid solution containing hexavalent chromium ions, as a result of which copper is brought into solution as cupric sulfate and the chromium compound is reduced to a trivalent state. Iron present in the starting material is also dissolved as a ferric compound. The dissolved iron is precipitated by hydrolyzing the solution at a temperature above 130° C. under pressure, and after separating such precipitate the copper is electrowon from the residual solution and the trivalent chromium is reoxidized to the hexavalent state in a bifluid electrolytic operation.

BACKGROUND OF THE INVENTION

Many proposals have heretofore been made for recovering copper by leaching from copper-bearing raw materials, such as naturally occurring copper ores, copper concentrates prepared from sulfidic ores, copper scrap, etc. A few such materials, such as oxidized copper ores in which the copper is present as a carbonate or a silicate, are readily treated by leaching with dilute sulfuric acid. However, most cupriferous materials treated industrially for copper recovery contain copper in the metallic state or in the form of a sulfide in which the copper is monovalent, and such materials are substantially insoluble in water or dilute sulfuric acid. They must be oxidized to the divalent form to be made soluble in an aqueous leaching medium. Various leaching procedures for the recovery of copper from such cupriferous materials using oxidizing conditions to bring metallic copper or cuprous copper into solution have been proposed. For example, leaching of sulfidic copper ores with a solution of sulfuric acid and ferric sulfate has been used with some success, especially in the treatment of mixed ores containing both oxidized copper and sulfidic copper (mainly chalcocite) minerals. This leaching reagent does not effectively attack chalcopyrite, however, and has not proved economically satisfactory for the treatment of predominately sulfidic copper ores and concentrates which usually contain substantial chalcopyrite.

Limited success has also been obtained commercially by leaching some copper bearing ores at high temperature and pressure under oxidizing conditions with ammoniacal reagents. The need for high pressure autoclave equipment has heretofore limited the utility of such procedures to the treatment of relatively high-value copper-nickel ores.

The leaching of cupriferous raw materials with a sulfuric acid solution containing chromic acid or a dichromate was proposed in British Pat. No. 240,888, but this procedure has never heretofore achieved commercial success, perhaps because the procedure described in the patent includes no satisfactory technique for eliminating the iron which is normally present in cupriferous raw material and dissolves to some extent with the copper, and because the procedure of such patent does not provide adequately for the regeneration of hexavalent chromium which has been reduced to the trivalent state by side reactions such as oxidation of ferrous iron to ferric and oxidation of sulfides to sulfate.

BRIEF DESCRIPTION OF INVENTION

In accordance with the invention, copper is recovered from oxidizable iron-bearing cupriferous raw material by a cyclical leaching and electrowinning process. The raw material may be a sulfidic copper ore or concentrate, or an oxidized ore or mineral such as chrysocolla or malachite, or a material in which the copper is present in metallic form such as native copper, copper scrap or cement copper. It may also be a waste product such as copper smelter slag or mill tailing. Moreover, although the invention is particularly directed to the treatment of cupriferous material, it may be applied equally well to nickeliferous material in which the copper is replaced in whole or in part by nickel. In the following description the term "cupriferous" material includes mixed copper-nickel and other nickeliferous materials as well.

The cupriferous material is first leached with an aqueous sulfuric acid solution containing ions of hexavalent chromium, such as are provided by chromic acid or a dichromate. After dissolution of a substantial portion of the copper (and/or nickel) the leach solution, depleted in acid to a pH above 0.6 and containing dissolved copper, trivalent iron, and trivalent chromium ions, is separated from the undissolved residue. The separated leach solution then is heated at superatmospheric pressure and at a temperature above 130° C. to hydrolyze the iron and cause it to precipitate in the form of a basic ferric sulfate salt. This precipitate is separated from the residual solution, and the latter is then subjected to a first bifluid electrolysis to electrowin metallic copper from the catholyte, and to regenerate sulfuric acid and partially reoxidize trivalent ions to hexavalent chromium ions in the anolyte. The anolyte from this first bifluid electrolysis then is subjected as anolyte to a second bifluid electrolysis to oxidize substantially all remaining trivalent chromium ions to hexavalent form, and the anolyte discharged from this second bifluid electrolysis is recycled to the leaching operation for treatment of a further quantity of the cupriferous material.

The leaching reagent employed in the process generally contains from 75 to 280 g./l. sulfuric acid and 10 to 80 g./l. of chromium, substantially all of which is in the hexavalent form, plus recycled amounts of dissolved copper and iron compounds. A preferred leaching reagent will contain from 100 to 200 g./l. of sulfuric acid, 15 to 60 g./l. chromium, 15 to 40 g./l. of recycled copper, and up to 5 g./l. of recycled iron.

The leach solution withdrawn from the leaching operation will be substantially enriched in copper, and will also be enriched in iron, but will be largely depleted in acid. Typically, the leach solution will contain 30 to 60 g./l.

copper, 10 to 30 g./l. iron in the trivalent state, 10 to 80 g./l. chromium mainly in the trivalent state, and will have a pH not less than about 0.6, say between 0.6 and 3.

To minimize oxidation to sulfate of sulfur present in the starting cupriferous material, it is desirable to avoid the presence of high concentrations of hexavalent chromium at any time during the leaching operation. To this end, it is desirable to maintain the concentration of hexavalent chromium in the solution in contact with the raw material during leaching below about 5 g./l. by adding fresh leach reagent slowly, as required by the progress of the leaching reactions.

Hydrolysis of the iron takes place readily and does not require unusually high pressures. In general, hydrolysis is advantageously carried out at a temperature in the range from 130° C. to 250° C. at equilibrium pressure. Several basic ferric sulfate compounds are stable in sulfuric acid solutions at elevated temperatures, and more than one of them may be present in the basic precipitate that forms at a temperature above 130° C. and at a pH from 0.6 to 3. The precipitate probably is predominantly $3Fe_2O_3 \cdot 4SO_3 \cdot 9H_2O$, but it may include compounds having a different proportion of $SO_3$ to $Fe_2O_3$ and for that reason is herein called a "sulfate salt" rather than simply a "sulfate." The precipitation of such compounds from sulfuric acid solution containing dissolved copper is described by T. R. Scott in "Unit Processes in Hydrometallurgy," pages 169 to 182, published 1964 by the American Institute of Mining, Metallurgical and Petroleum Engineers.

In the first bifluid electrolysis, the residual solution from which the basic ferric sulfate salt precipitate has been separated flows substantially continuously and sequentially first as catholyte in contact with the cathode and then as anolyte in contact with the anode through a bifluid electrolytic cell wherein the anolyte and catholyte are separated by a permeable diaphragm. The cathodes on which copper is electrolytically deposited are periodically withdrawn from the catholyte and are replaced by new copper starting sheet cathodes. The copper produced in this fashion is of electrolytic grade and can be marketed as cathodes or can be melted and cast into standard copper shapes.

The anolyte from the first bifluid electrolysis flows continuously as anolyte in contact with the anode through the second bifluid electrolysis, and thence is recycled to the leaching operation. The catholyte in this operation is simply an aqueous sulfuric acid solution containing say 50 to 250 g./l. sulfuric acid, which seeps through the diaphragm into the catholyte. Make-up sulfuric acid solution is added to catholyte as required to replenish such seepage.

When, in the leaching of sulfidic materials, there is a build-up in the sulfate concentration of the leach solution, some or all of the anolyte from the second bifluid operation may be treated to remove sulfate (and other impurities) therefrom prior to recycling to the leaching operation. Sulfate removal may be accomplished by treating the anolyte with calcium carbonate and filtering the resulting gypsum precipitate from the solution.

The residue from the leaching operation generally will contain some undissolved copper and perhaps other values. This residue may be releached with additional sulfuric acid containing hexavalent chromium ions, and the releach solution may then be recycled to the main leaching operation. Alternatively, if the raw material is a copper sulfide, the solid leached residue may be subjected to a flotation operation to recover a copper concentrate, which may be then treated in the leaching operation.

DESCRIPTION OF THE DRAWING

The invention is described below in greater detail with specific reference to the accompanying drawing, the single figure of which is a flow sheet of a preferred embodiment according to the invention, showing enclosed in dashed lines certain optional procedures which may be incorporated in the process.

DESCRIPTION OF A SPECIFIC EMBODIMENT OF THE PROCESS

The exemplary embodiment of the invention described below with reference to the accompanying flow sheet is for the treatment of a conventional copper flotation concentrate containing chalcocite ($Cu_2S$) and chalcopyrite ($CuFeS_2$) as its main copper-bearing minerals. Typically, such concentrate also will contain some siliceous material, minor quantities of other sulfidic copper minerals, pyrites and perhaps small quantities of other values such as molybdenum sulfide, gold, silver, etc.

The copper concentrates are in finely-divided form, and are subjected to a leaching operation with aqueous sulfuric acid solution in which a compound of hexavalent chromium is dissolved. An agitated leach is preferred, in order to assure effective intermixing of the finely-divided concentrates with the leach reagent. Leaching may be conducted as a batch type operation, or it may be carried out as countercurrent operation in a series of leaching tanks. Any conventional leaching procedure may be used with success.

The leaching solution essentially is aqueous sulfuric acid containing from 75 to 280 g./l. $H_2SO_4$, in which the compound of hexavalent chromium is dissolved to a concentration which may be in the range from 10 to 80 g./l. total chromium. The acid concentration in the leach solution is selected on the basis of the composition of the concentrates, and must be high enough to ensure dissolution of the copper and to satisfy other acid consumers present, such as the iron present in chalcopyrite. It should also be sufficiently high to ensure that the leach solution at the conclusion of the leaching operation is distinctly acid, but not too acid to hamper the subsequent hydrolysis operation. Advantageously, the acid concentration of the leaching reagent fed into the leaching operation is in the range from 100 to 200 g./l. A typically leaching reagent will contain about 160 g./l. $H_2SO_4$.

The chromium compound may be any compound of hexavalent chromium soluble in the aqueous acid leach medium. The reagents most readily available are chromic acid and other soluble chromates such as magnesium chromate, and dichromates such as sodium dichromate. Either may be used successively or they may be used jointly. The amount of chromium compound present must provide sufficient hexavalent chromium to oxidize native and cuprous copper to the cupric form, to oxidize the sulfide component of the copper sulfide to elemental sulfur, and to satisfy the needs of unavoidable side reactions such as oxidation of ferrous iron to ferric and of sulfide sulfur to sulfate. Some excess of hexavalent chromium over these needs is desirable, but the excess need not be great. A typical leaching reagent contains 15 to 60 g./l. total chromium, mostly in the hexavalent form, say about 40 g./l.

The leaching reagent is for the most part a regenerated solution recovered from the treatment of the off-solution from a previous leaching operation, and it therefore contains substantial quantities of recycled copper and a small amount of recycled iron. The copper content in the recycled leaching reagent conventionally is in the range from 15 to 40 g./l. copper, present as dissolved cupric sulfate. Some dissolved iron, mainly in form of ferric sulfate, also is usually present in a concentration up to 5 g./l.

Recycled solution of course constitutes the bulk of leaching reagent delivered to the leaching operation, but it may be supplemented by dichromate solution recovered from treatment of the iron precipitate and by copper-bearing releach solution recovered from the treatment of leach residue in a secondary leaching operation. Additionally, any necessary make-up amounts of sulfuric acid and hexavalent chromium are supplied to the leaching operation in the form of aqueous solutions of these reagents.

The duration of the leaching operation depends on the ease of treatment of the concentrates or other material being leached. Leaching for as little as five or ten minutes will in many cases suffice to extract a large amount of the copper from the concentrates; but usually the leaching time will be longer—up to one-half hour usually and in some cases up to an hour or more. Copper dissolves very rapidly from fresh concentrates during the early part of the leaching operation, and then more slowly as time of leaching increases. This may be due to deposition of a film of elemental sulfur, formed as a product of the leach reaction, on the copper-bearing mineral particles. Normally the leaching operation will be continued only so long as is necessary to obtain an acceptably high recovery of the soluble metal values from the raw material, and this usually is accomplished in ten to thirty minutes.

Leaching normally is conducted at a somewhat elevated temperature, say 50° to 95° C., but a higher or lower temperature may be used if desired. The leaching reaction is exothermic and will maintain the temperature of a normal leaching operation at up to 50° C., For higher temperatures heat must usually be supplied from an outside source. In the process of the flowsheet a typical leaching temperature is in the range from 70° to 95° C. Neither time of leaching nor temperature is critical. Each is selected in the particular case depending on leaching characteristics of the concentrates, the availability of heat for the leaching operation, and the desired recovery of copper.

During leaching much of the sulfur present in the concentrates is oxidized to elemental form, but some is oxidized further to sulfate. It is of course desirable to minimize the amount of sulfate sulfur formed, both to avoid consumption of hexavalent chromium and to avoid accumulation of sulfates in the leach solution. Sulfate formation is promoted by the presence of a high concentration of hexavalent chromium during the progress of the leaching operation. Accordingly, it is desirable to feed leaching reagent into the leaching operation only as it is consumed by the concentrates, so that at no time during leaching is there any very substantial excess of hexavalent chromium. By metering the rate of addition of leaching reagent to the leaching operation so that the concentration of hexavalent chromium actually present at any moment is less than about 5 g./l., the amount of sulfur oxidized to sulfate form can be kept within reasonable bounds.

Following are illustrative reactions which take place during leaching:

latter as ferric sulfate. Total chromium is substantially the same as in the initial leaching reagent, but it is present primarily in the trivalent form. The leach solution is depleted in acid but is still distinctly acidic, having a pH above 0.6, say in the range from 0.6 to 3, and preferably about 1.

The first step in the treatment of the leach solution is to precipitate the dissolved iron. This is accomplished by hydrolyzing the leach solution at a temperature above 130° C. and at superatmospheric pressure to precipitate a basic ferric sulfate salt. Hydrolysis proceeds readily at temperatures in the range from 130° C. to 250° C., at equilibrium pressure, even when the pH of the solution is not substantially above about 1.0. Because of the pressure involved, the hydrolysis operation is carried out in an autoclave. Since the pressure generally will not exceed about 700 pounds per square inch even at 250° C., the autoclave presents no major design problem. Preferably hydrolysis is carried out at the temperature from 150° to 200° C., at equilibrium pressure in the range from 50 to 700 lbs. per square inch. An advantageous autoclaving temperature is in the range from 170° to 180° C. Heating of the leach solution in the autoclave is advantageously accomplished by a direct injection of steam into the solution in the autoclave.

Ferric (but not ferrous) sulfate solutions hydrolyze readily at high temperatures. The stable basic ferric oxides at high temperatures, in addition to $Fe_2O_3$, are hydrated complexes of $Fe_2O_3$ and $SO_2$. In strongly acid solutions (pH 0.6 to 3) at temperatures above 130° C. the predominant stable basic ferric salt has the composition $3Fe_2O_3 \cdot 4SO_3 \cdot 9H_2O$, but other stable complexes such as $Fe_2O_3 \cdot 3SO_3$ and $Fe_2O_3 \cdot 2SO_3H_2O$ may also form. The basic sulfate salt complex forms readily and rapidly when an acid solution containing ferric sulfate is sufficiently heated, but the completeness with which dissolved iron is converted to this insoluble material depends on the acidity of the solution. At a pH near 1.0, complete precipitation of the iron is not achieved, but the iron content of the solution is readily reduced from near 25 g./l. to less than 3 g./l. and such an iron content in the recycled solution is not objectionable.

Autoclaving requires only a short period of time. Substantially all the iron which will precipitate at the chosen autoclave temperature forms within ten minutes to half an hour, and so autoclaving is preferably terminated within this time period. However, autoclaving for a longer time (up to an hour or more) is not objectionable except for the extra cost involved.

We have found that the presence of sodium ions in the solution during the autoclave treatment promotes and facilitates precipitation of the basic ferric sulfate salt. If necessary, it would be desirable to add a sodium salt to

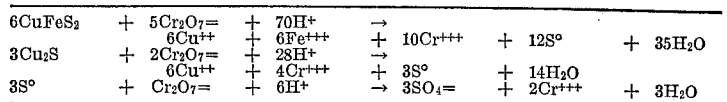

At the conclusion of the leaching operation, insoluble residue of the leached concentrates is separated from the leach solution. This may be accomplished by decantation, or it may be accomplished by filtration. If decantation is employed, it is preferably a countercurrent operation in a series of thickeners. Filtration however is preferred because a quick and more thorough separation of solution from leach residue may thereby be achieved.

The insoluble leach residue (filter cake) is either discarded or treated to recover values contained therein. The separated leach solution is treated for recovery of its copper content and to regenerate the leaching reagent. This leach solution will contain, for example, 30 to 60 g./l. of dissolved copper and 10 to 30 g./l. of dissolved iron, the former essentially as cupric sulfate and the the leach solution to ensure the presence of sodium ions during hydrolysis. However when the hexavalent chromium compound employed in the leaching operation comprises sodium dichromate, it generally supplies all the sodium ions necessary for promoting precipitation of the iron during autoclaving.

Precipitation of iron during the autoclaving involves reactions of which the following is illustrative:

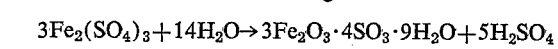

After autoclaving the solution for the indicated period of time, the autoclave pressure is reduced to atmospheric. This can be done either by venting steam from the autoclave and then emptying it of the slurry of solution and precipitate, or by blowing such slurry out through a blow-down valve while the autoclave contents are still under pressure.

The discharge from the autoclave is passed through a heat exchanger to a filter, where the basic ferric sulfate salt precipitate is separated from the residual solution. The heat exchanger is utilized to preheat recycled leached solution en route to the leaching operation. Such preheating of the leach solution promotes the leaching operation by having it proceed at an elevated temperature, and it conserves heat in the autoclaving operation by providing heated leach solution for treatment in the autoclave.

The filtrate separated from the iron precipitate is treated for copper recovery. The iron precipitate itself carries with it an appreciable quantity of chromium, probably in the form of chromite, and advantageously the precipitate is treated to recover it. Such treatment preferably involves mixing the iron cake from the autoclave filter with a suitable alkaline material, and firing in an oxidizing atmosphere. Sodium carbonate or sodium hydroxide are preferred alkaline materials although the corresponding compounds of other alkali metals may be used. Also, such alkaline materials as lime may be used in whole or in part in forming the mixture with the iron cake.

Firing may take place in a reverbertory furnace or a rotary kiln. In either case, air passes freely over or through the mixture during firing to provide oxygen for oxidation of the trivalent chromium in the iron cake to hexavalent form. The charge during firing is heated to a temperature in excess of 1250° F. and preferably to 1400° F. or somewhat higher.

The fired charge is withdrawn from the furnace, and after cooling is leached with water. The chromium, now in the form of a water-soluble dichromate, is readily extracted, and is recycled for reuse in leaching additional copper concentrates. The iron oxide residue of the leaching operation is discarded.

The filtrate from the primary iron precipitation is subjected to electrolysis in the catholyte compartment of a bifluid electrolytic cell, where its copper content is electrowon. This first bifluid electrolytic operation is carried out in a diaphragm cell having anolyte and catholytic compartments separated by a permeable ceramic or fabric diaphragm and having an overflow chamber at one end of the cell through which catholyte discharged from the catholyte compartment is directed into the anolyte compartment. The solution thus flows sequentially first through the catholyte compartment of the cell and then through the anolyte compartment, from which it is discharged. The catholyte is under a slight hydrostatic head with respect to the anolyte, to prevent hexavalent chromium from coming in contact with the cathode deposit.

The cathode reactions which take place in the catholyte compartment involve mainly the depositon of metallic copper on the cathodes. The cathodes may be conventional copper starting sheets hung in closely spaced arrangement in the catholyte compartment. When a sufficient weight of copper has deposited on them, they are withdrawn from the cell and are replaced with new copper starting sheet cathodes. The copper cathode product is of electrolytic quality and is marketable as such or it may be melted and cast into standard copper shapes such as billets, cakes, and wirebars.

In the anolyte compartment, anodes preferably of lead or lead alloy are arranged in closely spaced relation in contact with the anolyte flowing through the cell. In the anolyte, the principal reaction involves reoxidation of trivalent chromium to hexavalent form. This bifluid operation is conducted at a low enough cell voltage, say about 3.0, so that there is little tendency for any hydrogen polarization to occur at the cathode. As a result, only an amount of hexavalent chromium is regenerated at the anode corresponding to the amount of copper deposited at the cathode.

The overall cell reaction principally occurring in the first bifluid electrolysis is the following:

$$6Cu^{++} + 4Cr^{+++} + 14H_2O \rightarrow 2Cr_2O_7^= + 6Cu^\circ + 28H^+$$

The outflow from the first anolyte compartment of the first electrolytic operation is only partially regenerated, for hexavalent chromium converted to trivalent form by oxidation of iron and sulfur during the leaching operation remains to be reoxidized. Accordingly, the anolyte from the first bifluid electrolysis is flowed as anolyte through the anolyte compartment of a second bifluid electrolytic cell. This cell also is one in which the anolyte and catholyte compartments are separated by a permeable diaphragm, but here the incoming solution flows only through the anolyte compartment and thence out of the cell. In the anolyte compartment, lead anodes are disposed similarly to the arrangement in the first bifluid cell, and in the catholyte compartment of this second bifluid cell, cathodes which may be of copper are arranged similarly to the cathodes in the first bifluid cell. The catholyte here is merely aqueous sulfuric acid solution containing sufficient acid to permit the flow of current between anode and cathode with low electrical resistance.

In the second bifluid electrolytic operation, substantially all remaining trivalent chromium is reoxidized to hexavalent form, so that the outflow from this cell is substantially fully regenerated with respect to its hexavalent chromium content. At the cathode, hydrogen is liberated and is vented to the atmosphere (unless it is considered desirable to collect it as a product of the process). The reaction requires a cell voltage of about 3.0. The catholyte is maintained at a slight hydrostatic head with respect to the anolyte in the second bifluid cell, so that some catholyte steadily seeps into the anolyte in order to avoid contamination of catholyte with chromium or copper. Make-up aqueous sulfuric acid is added to the catholyte compartment as required to compensate for such seepage.

The overall cell reaction which takes place during this second bifluid electrolysis is as follows:

$$6Cr^{+++} + 18H_2O \rightarrow 3Cr_2O_7^= + 24H^+ + 9H_2^\circ$$

In both bifluid electrolytic operations, acid regeneration occurs in the anolyte as shown by the foregoing reactions. Thus, the anolyte solution flowing from the anolyte compartment of the second bifluid cell is substantially fully regenerated with respect to both sulfuric acid and hexavalent chromium ions, and is ready for recycling to the leaching operation. The amount of sulfuric acid shown by the foregoing cell reaction to be regenerated is somewhat less than the amount of acid consumed (ideally) in the leaching operation. The difference, however, is made up by acid formed during the hydrolytic precipitation of iron in the autoclaving treatment; and hence it is correct to state that the anolyte outflow from the second electrolytic cell is substantially fully regenerated in acid and in hexavalent chromium.

Since it is neither desirable nor practical to precipitate more than about half the copper content from the electrolyte in the first bifluid electrolysis, the anolyte recycled to the leaching operation from the second bifluid electrolysis will contain substantial copper (10 to 30 g./l.) It will also contain such dissolved iron as was not removed during autoclaving (say up to 3 g./l). Recycling of such amounts of copper and iron are not burdensome on the process, however.

It is generally advantageous to treat all or a portion of the anolyte outflow from the second electrolytic operation to eliminate excess sulfate formed during leaching. This is conveniently done by treating a bleed from the outflow solution with lime or limerock to precipitate gypsum (calcium sulfate). Such precipitate is filtered or otherwise separated from the solution, and the resulting solution with its reduced sulfate concentration is recycled to the leaching operation.

Anolyte solution bled off for sulfate precipitation may also be treated as required to remove other accumulations of impurities which may build up in the leach solution, such as arsenic, selenium, tellurium, etc.

As noted above, the insoluble residue from the leaching operation may contain values which it is desirable to recover. Various alternative procedures may be used for the treatment of such residue.

This residue generally contains elemental sulfur formed as a result of the reactions which take place during leachin. The residue may be heated to vaporize this sulfur, which then may be recovered by condensation. Alternative methods of separating the sulfur from the leached residue are also available and may be use if desired. The major value present in the leach residue remaining after desulfurization will be undissolved copper, which is present in its original form as a sulfide mineral. Hence one method for treating the desulfurized residue is to subject it to a froth flotation operation to prepare a concentrate of the undissolved copper sulfides present. When this method is employed, the concentrate from such flotation operation may be introduced into the leaching operation for retreatment, and the flotation tailings may be either discarded or treated for recovery of gold, silver, molybdenum sulfide or such other values as may be contained therein.

Instead of flotation, a releaching operation may be employed to recover the undissolved copper from the desulfurifized leach residue. In such case, the residue is re-pulped with regenerated leaching reagent, or with make-up leach reagent. Thereafter the releach solution is filtered or otherwise separated from the residual insoluble residue and is recycled to the primary leaching operation. As in the case of flotation treatment, the residue from the releaching operation may be discarded or may be treated for any values it contains.

We claim:
1. The method of recovering copper from oxidizable iron-bearing cupriferous material which comprises the steps of:
  (a) leaching the cupriferous material with an aqueous sulfuric acid solution containing hexavalent chromium ions,
  (b) separating the leach solution depleted in acid at a pH above 0.6 and containing divalent copper, trivalent iron and trivalent chromium ions from the undissolved residue,
  (c) hydrolyzing the separated leach solution under pressure at a temperature above 130° C. to form a basic ferric sulfate salt precipitate,
  (d) separating said precipitate from the residual solution,
  (e) subjecting said residual solution to a first bifluid electrolysis to deposit metallic copper from the catholyte and to regenerate sulfuric acid and partially reoxidize trivalent chromium ions to hexavalent chromium ions in the anolyte,
  (f) subjecting anolyte from said first bifluid electrolysis to a second bifluid electrolysis to oxidize substantially all remaining trivalent chromium ions to hexavalent chromium ions in the anolyte,
  (g) and recycling anolyte from said second bifluid electrolysis to leach a further quantity of said cupriferous material.

2. The method according to claim 1 wherein the cupriferous material is leached with a solution comprising recycled anolyte from the second bifluid electrolysis plus make up amounts of sulfuric acid and a hexavalent chromium compound and containing 75 to 280 g./l. sulfuric acid and 10 to 80 g./l. chromium plus recycled amounts of dissolved copper and iron compounds.

3. The method according to claim 2 wherein the solution contains 100 to 200 g./l. sulfuric acid, 15 to 60 g./l. chromium, 15 to 40 g./l. copper and up to 5 g./l. iron.

4. The method according to claim 1 wherein the leach solution withdrawn from the leaching operation contains 10 to 80 g./l. chromium mainly in the trivalent state, 30 to 60 g./l. copper, 10 to 30 g./l. iron mainly in the trivalent state, and has a pH not less than about 0.6.

5. The method according to claim 1 wherein the cupriferous material is sulfidic and the leach solution is slowly added so that the concentration of hexavalent chromium in contact with such material is at all times maintained below about 5 g./l., thereby to limit oxidation of sulfide sulfur to sulfate.

6. The method according to claim 1 wherein the leach solution as delivered to the hydrolyzing operation contains sodium ions to facilitate precipitation of the basic ferric sulfate salt.

7. The method according to claim 1 wherein the basic ferric sulfate salt precipitate containing a compound of chromium is mixed with an alkaline material, the mixture is fired at a temperature above 1250° F., the fired mixture is leached with an aqueous medium, the leach solution containing a dichromate in solution is separated from the individual ion-bearing residue, and the dichromate solution thus obtained is recycled for use in leaching a further quantity of cupriferous material.

8. The method according to claim 7 wherein the basic ferric sulfate salt is mixed with an alkaline compound selected from the group consisting of sodium carbonate and sodium hydroxide and the mixture is fired at a temperature of about 1400° F.

9. The method according to claim 1 wherein the leach solution is hydrolyzed by heating to a temperature in the range from 130° C. to 250° C. at equilibrium pressure.

10. The method according to claim 1 wherein the residual solution from the basic ferric sulfate salt precipitation flows substantially continuously and sequentially as catholyte in contact with the cathode and then as anolyte in contact with the anode in the conduct of the first bifluid electrolysis.

11. The method according to claim 10 wherein cathodes bearing electrolytically deposited copper are periodically withdrawn from the catholyte and new cathode starting sheets are introduced into the catholyte.

12. The method according to claim 1, wherein anolyte from the first bifluid electrolysis flows substantially continuously as anolyte in contact with the anode through the second bifluid electrolysis and thence is recycled to the leaching operation.

13. The method according to claim 12 wherein the catholyte in contact with the cathode during conduct of the second bifluid electrolysis is aqueous sulfuric acid.

14. The method according to claim 13 wherein catholyte continuously seeps from the catholyte into the anolyte and aqueous sulfuric acid is added to the catholyte to make up for such seepage.

15. The method according to claim 1 wherein the cupriferous material contains sulfidic constituents which are in part oxidized to sulfate ions during leaching, and the anolyte from the second bifluid electrolysis is treated prior to recycling to the leaching operation to precipitate an insoluble sulfate therefrom, thereby to remove excess sulfate formed during leaching.

16. The method according to claim 15 wherein the anolyte is treated with calcium carbonate to precipitate calcium sulfate, such precipitate is separated from the residual anolyte solution, and said residual anolyte solution is recycled to the leaching operation.

17. The method according to claim 1 wherein the undissolved residue from the leaching operation after separation therefrom of the leach solution is treated to remove elemental sulfur and then is releached with additional aqueous sulfuric acid solution containing hexavalent chromium ions, and the resulting releach solution after separation from the undissolved residue is introduced into the leaching operation.

18. The method according to claim 1 wherein the cupriferous material is sulfidic, the undissolved residue from the leaching operation is treated to remove elemental sulfur therefrom and then is subjected to a froth flotation operation to recover in a concentrate the undissolved copper sulfide contained in said residue, and said concentrate is treated for the recovery of its copper content.

19. The method according to claim 18 wherein said concentrate is recycled to the leaching operation.

References Cited

UNITED STATES PATENTS

| | | | |
|---|---|---|---|
| 3,271,279 | 9/1966 | Poor | 204—108 |
| 1,514,153 | 11/1924 | Greenawalt | 204—108 |

JOHN H. MACK, Primary Examiner

R. L. ANDREWS, Assistant Examiner

U.S. Cl. X.R.

75—117